(12) United States Patent
Boutin et al.

(10) Patent No.: US 10,584,945 B2
(45) Date of Patent: Mar. 10, 2020

(54) IGNITER CASE

(71) Applicants: Patrice Boutin, Taverny (FR); Jose Reinoso, Aulnay sous Bois (FR)

(72) Inventors: Patrice Boutin, Taverny (FR); Jose Reinoso, Aulnay sous Bois (FR)

(73) Assignee: AUTOLIV DEVELOPMENT AB, Vargarda (SE)

(*) Notice: Subject to any disclaimer, the term of this patent is extended or adjusted under 35 U.S.C. 154(b) by 197 days.

(21) Appl. No.: 15/538,755

(22) PCT Filed: Dec. 17, 2015

(86) PCT No.: PCT/EP2015/080191
§ 371 (c)(1),
(2) Date: Jun. 22, 2017

(87) PCT Pub. No.: WO2016/102293
PCT Pub. Date: Jun. 30, 2016

(65) Prior Publication Data
US 2018/0172411 A1 Jun. 21, 2018

(30) Foreign Application Priority Data
Dec. 22, 2014 (FR) .................................. 14 63129

(51) Int. Cl.
*F42B 3/198* (2006.01)
*F42B 3/04* (2006.01)
(Continued)

(52) U.S. Cl.
CPC .............. *F42B 3/198* (2013.01); *F42B 3/04* (2013.01); *F42B 3/125* (2013.01); *F42B 3/127* (2013.01); *B60R 2021/26029* (2013.01)

(58) Field of Classification Search
CPC .. F24B 3/198; F24B 3/127; F24B 3/04; F24B 3/125; B60R 2021/26029
See application file for complete search history.

(56) References Cited

U.S. PATENT DOCUMENTS 4,724,765 A * 2/1988 Evrard .................... F42B 12/40
102/248
5,443,286 A * 8/1995 Cunningham ...... B60R 21/2644
102/531

(Continued)

FOREIGN PATENT DOCUMENTS

FR 2877082 A1 4/2006
WO WO-02/08028 A1 1/2002

OTHER PUBLICATIONS

International Search Report for PCT/EP2015/080191, ISA/EP, Rijswijk, NL, dated Jan. 22, 2016.

(Continued)

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A method of manufacturing a metallic case of a pyrotechnical igniter having a wall with at least one weak zone and an inner surface in the case with at least one part facing this at least one weak zone includes positioning the case on a matrix having a plane zone. The method further includes striking the wall with at least one punch so as to, in a single movement of striking, deform at least the part of the inner surface facing this at least one weak zone and having at least one initially curved-in zone in order to bring it on the plane zone and to form in this manner a plane inner surface, and to form the at least one weak zone.

17 Claims, 2 Drawing Sheets

(51) Int. Cl.
*F42B 3/12* (2006.01)
*B60R 21/26* (2011.01)

(56) References Cited

U.S. PATENT DOCUMENTS

| | | | | |
|---|---|---|---|---|
| 5,632,505 | A * | 5/1997 | Saccone | B60R 21/264 137/68.13 |
| 6,012,737 | A * | 1/2000 | Van Wynsberghe | B60R 21/2644 280/737 |
| 6,116,642 | A * | 9/2000 | Shirk | B60R 21/264 280/736 |
| 6,491,321 | B1 * | 12/2002 | Nakashima | B01D 46/24 102/530 |
| 6,848,365 | B2 * | 2/2005 | Avetisian | F42B 3/195 102/202.5 |
| 6,941,867 | B2 * | 9/2005 | Renz | F42B 3/125 102/202.11 |
| 7,357,083 | B2 * | 4/2008 | Takahara | F42B 3/127 102/202.14 |
| 7,549,375 | B2 * | 6/2009 | Cook | F42B 39/14 102/377 |
| 7,607,688 | B2 * | 10/2009 | Kato | F42B 3/04 137/68.27 |
| 7,730,837 | B2 * | 6/2010 | Lahitte | F42B 3/127 102/202.12 |
| 7,845,278 | B2 * | 12/2010 | Brisighella, Jr. | B60R 21/26 102/202.11 |
| 8,186,274 | B2 * | 5/2012 | Van Stratum | F42B 5/26 102/469 |
| 8,276,514 | B2 * | 10/2012 | Fink | F42B 3/198 102/202.12 |
| 8,602,183 | B2 * | 12/2013 | VandenBerge | F16F 7/128 188/372 |
| 2003/0177936 | A1 * | 9/2003 | Luebbers | B60R 21/26 102/530 |
| 2004/0107856 | A1 * | 6/2004 | Hennings | F42B 3/127 102/202.7 |
| 2004/0216631 | A1 * | 11/2004 | Fink | F42B 3/103 102/200 |
| 2007/0261582 | A1 * | 11/2007 | Lahitte | F42B 3/127 102/202.5 |
| 2009/0044715 | A1 * | 2/2009 | Hartl | F42B 3/127 102/202.9 |
| 2009/0179408 | A1 * | 7/2009 | Brisighella, Jr. | B60R 21/26 280/741 |

OTHER PUBLICATIONS

Written Opinion of the ISA for PCT/EP2015/080191, ISA/EP, Rijswijk, NL, dated Jan. 22, 2016.

* cited by examiner

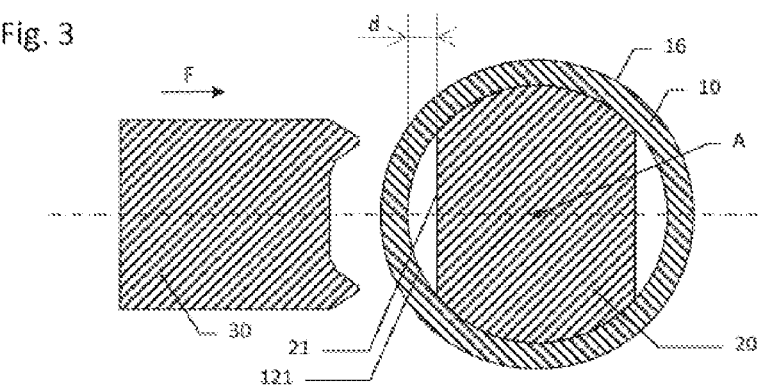
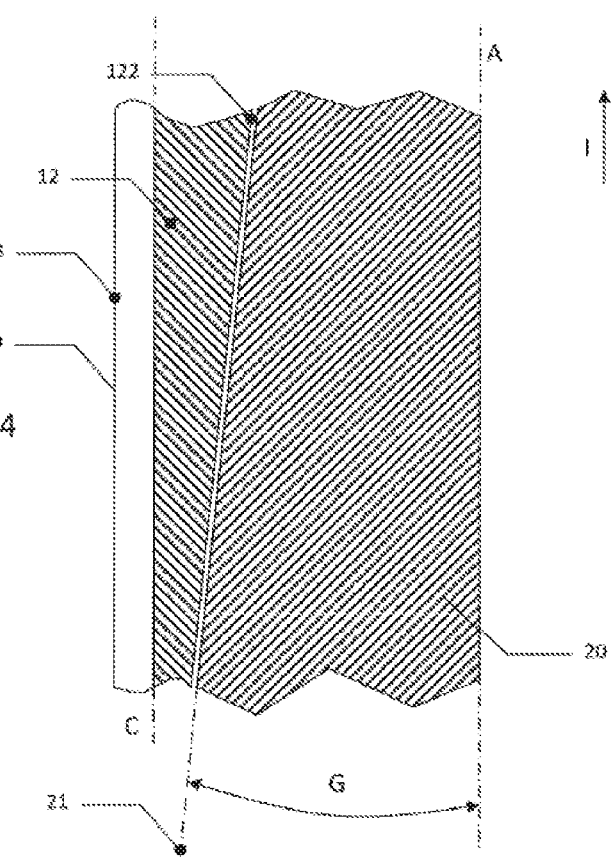

IGNITER CASE

CROSS-REFERENCE TO RELATED APPLICATIONS

This application is a 371 U.S. National Stage of International Application No. PCT/EP2015/080191, filed on Dec. 17, 2015, which claims the benefit of and priority to French Patent Application No. 1463129, filed on Dec. 22, 2014. The entire disclosures of the above applications are incorporated herein by reference.

FIELD

The present invention relates in a general manner to pyrotechnical igniters which can be used in different pyrotechnical devices in particular assembled in automobiles and more particularly to the metallic cases used in these igniters and to their method of manufacture.

BACKGROUND

Pyrotechnical igniters are known in the prior art which comprise a case formed by a lateral wall comprising an inwardly curved zone and at least one weak zone as is disclosed by the document US2009179408.

The weak zone forms a vent hole on the side wall for freeing gases and pyrotechnical material. This weak zone assumes the shape of a local reduction of the thickness of the side wall. The thickness of the remaining material allows the vent hole to open at a pressure lower than the rupture pressure of the side wall when the interior of the case is subjected to a pressure.

The precision of this reduction of thickness is essential for guaranteeing a repeatable and reproducible functioning between the igniters manufactured and therefore the devices in which they are positioned. A defect in the realising of the weak zone can cause a poor opening of the vent hole, which can bring about a deterioration of the case and a malfunctioning of the device in which it is positioned.

In order to guarantee a good realisation of the weak zone it is known to form a plane zone which is formed on the side surface of the igniter prior to the realising of the weak zone and is sufficiently large to receive the weak zone subsequently in the manufacture of the case. The striking on the plane zone allows the tolerances required for the thickness of the material remaining at the bottom of the weak zone to be achieved. Such tolerances cannot be achieved without a striking of the weak zone on a plane zone.

This manner of proceeding brings it about that a step for realising a plane zone is necessary, which requires complementary tools and brings about maintenance costs. Furthermore, the plane zone reduces the useful internal volume of the case. Finally, the realising of the plane zone causes deformations of the outer case surface. These deformations are problematic;
for the subsequent positioning of an external plastic hood which generally serves to electrically insulate the igniter case from the outer environment of the igniter,
during the insertion of a glass crosspiece which closes the igniter,
during the welding of the case on the glass crosspiece, and
when the igniter receives an overmolding, since the tools must then be defined as properly as possible with the igniter.

SUMMARY

A goal of the present invention is to respond to the disadvantages of the prior art cited above and in particular, first of all, to propose a rapid method of manufacturing a pyrotechnical igniter case.

To this end a first aspect of the invention relates to a process for manufacturing a metallic case of a pyrotechnical igniter comprising a wall comprising at least one weak zone and an inner surface in the case with at least one part facing this at least one weak zone,
which manufacturing process comprises the steps of:
positioning the case on a matrix comprising a plane zone,
striking the wall with at least one punch in such a manner as to, in a single movement of striking:
deform at least the part of the inner surface facing this at least one weak zone and comprising at least one initially curved-in zone in order to bring it on this plane zone and to form in this manner a plane inner surface, and
to form this at least one weak zone.

The process is simplified because a step of realising a plane zone on the case prior to the striking of the weak zone is no longer necessary since the process makes these two operations in one and the same striking movement. Moreover, this allows the limiting of the deformations generated by the striking of the weak zone on the case wall while allowing the formation of a precise and reproducible weak zone. In fact, the plays between the piece to be made and the matrix should be taken into account at each striking step. These plays must be absorbed by the piece to be made. Therefore, any elimination of step eliminates plays and therefore limits the non-desired deformations. It can also be noted that the plastic deformations are imposed only once, which limits the variability on the total cold hammering of the material.

The weak zone positioned on the wall is designed to break at a predetermined pressure lower than a rupture pressure of this wall.

The wall is advantageously a side wall.

The process is more favourable to realising a weak zone on a side wall than on an end because for a side strike more positioning plays of the case on the matrix are necessary. Therefore, the elimination of a step is even more interesting.

The case is advantageously a piece made by a process of cold shaping such as stamping. The case can be formed by soft nickled steel such as DC04 or DC06 standardized by the standard NF-EN-10130.

Once the case has been stamped, prior to the formation of the weak zone the outer surface of the case and the inner surface of the case are parallel in accordance with known stamping tolerances. Therefore, the outer surface opposite an inner surface with a curved-in zone also has a curved-in zone.

The wall is advantageously designed in such a manner as to define a charging volume and this at least one weak zone defines a vent hole, which process is characterized in that the step of deforming at least the part of the inner surface facing this at least one weak zone and comprising at least one initially curved-in zone leaves at least a part of the vent hole curved in so as to maximize the charging volume.

Since the process only deforms the surfaces necessary for shaping the weak zone, it limits to the minimum the deformations of the wall, which limits the impact of the making of the weak zone on the outer environment of the case. The addition of components such as a protective hood or the application of further processes such as an insertion of a glass crosspiece and a welding of the case on the glass crosspiece are therefore facilitated. In other words, only the part of the wall which is to receive the weak zone is deformed (planed), and if the weak zone forms a line in a circular arc, then the part of the wall situated in this circular arc will remain at least partially curved in.

This wall is advantageously a side wall of the case and the process comprises a step of ejecting the case from the matrix according to an ejection axis of the case after the striking step and in which the step of the formation of the inner, plane surface comprises a step of forming the inner, plane surface with a clearance angle relative to the direction of extraction.

The clearance angle can be comprised between 0 and 1° and is advantageously comprised between 0 and 0.5°, borders included.

The process is advantageously characterized in that the step of striking the side wall with at least one punch permits the simultaneous forming of two, three or four weak zones.

The wall advantageously comprises an outer surface of the case, which at least one weak zone is defined by a profile extending along a curved line comprised in a plane, and the step of striking the wall comprises a step of deforming at least one initially curved-in part of this outer surface in order to bring it into this plane and to form this at least one weak zone.

The fact of simultaneously forming an inner, plane surface and a weak zone defined by a profile extending along a curved line comprised in a plane allows a predetermined rupture pressure of the weak zone which is controlled and reproducible to be guaranteed. In fact, it is simpler and easier to make and adjust tools whose striking surfaces are plane. Since the striking surfaces can be more readily realised, the weak zones of cases manufactured by different tools are more similar to each other and the population of the production is less dispersed.

The deformation step of this at least one part of the outer surface is advantageously a step of imposing an angle which is not zero between the plane of the outer surface and the inner, plane surface.

The combination of the non-zero angle between the plane of the outer surface and the inner, plane surface allows the location of the wall where the distance will be the lowest between the inner, plane surface and the plane of the outer surface to be controlled. It is at this location that the resistance to rupture of the weak zone will be the weakest. Therefore, this allows a controlled and reproducible opening of the case to be assured when it is subjected to a pressure greater than the predetermined rupture pressure of the weak zone.

A second aspect of the invention relates to a metallic case of a pyrotechnical igniter manufactured according to the process of the first aspect of the invention.

The metallic case advantageously comprises
a wall designed to define a charging volume,
at least one weak zone defined by a profile extending along a curved line positioned on the wall, designed to rupture at a predetermined pressure lower than a rupture pressure of the wall,
this at least one weak zone defines a vent hole, characterized in that this curved line is contained in a plane, and that at least a part of the vent hole is curved in such a manner as to maximise the charging volume. In other words, the vent hole presents an inner surface and an outer surface, and at least one part of the inner surface of the vent hole is curved in (therefore, just as the outer surface of the vent hole too).

The case advantageously comprises a bottom and the wall is lateral.

The wall is advantageously lateral and is cylindrical with a circular base along an axis and comprises two, three or four weak zones uniformly distributed around the axis.

A uniform distribution allows avoiding having to balance the igniter comprising the case during its operation.

A third aspect of the invention relates to a pyrotechnical igniter comprising a case according to the second aspect of the invention and a glass crosspiece, which case is welded on the glass crosspiece.

Furthermore, the pyrotechnical igniter advantageously comprises an insulating hood and/or an overmolding.

A fourth aspect of the invention relates to a gas generator comprising at least one pyrotechnical igniter according to the third aspect of the invention.

A fifth aspect of the invention relates to an automobile comprising at least one pyrotechnical igniter according to the third aspect of the invention.

BEST DESCRIPTION OF THE DRAWINGS

Other characteristics and advantages of the present invention will appear more clearly upon reading the following detailed description of an embodiment of the invention given solely by way of a non-limiting example and illustrated by the attached drawings in which:

FIG. 3 shows a section of the igniter case of FIG. 1 in a step of the process according to the first aspect of the invention;

FIG. 4 shows a folded-back section at the level of a part of a weak zone in the step of the process according to the first aspect of the invention along the segment H-H shown in FIG. 1.

DETAILED DESCRIPTION

Figure 1:
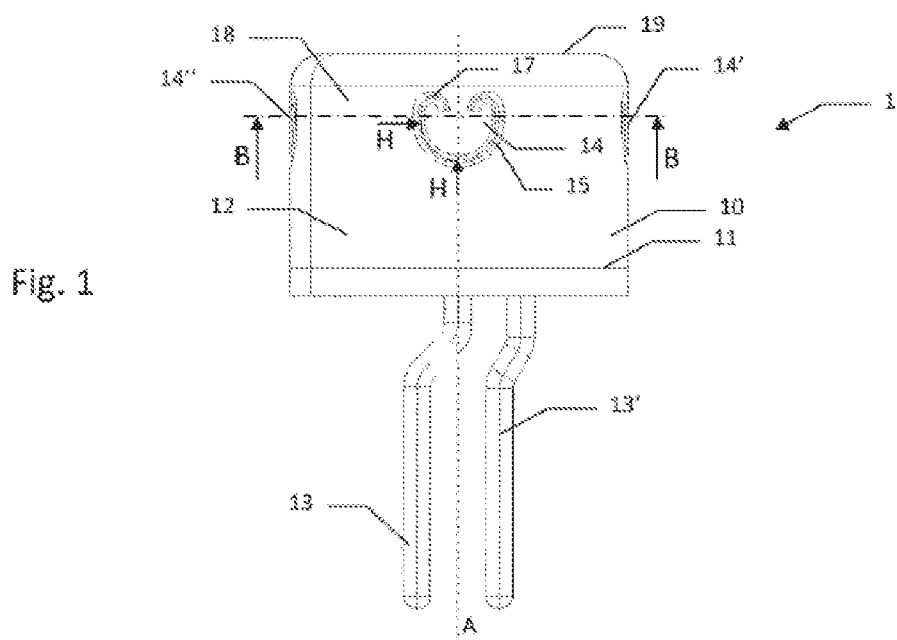
FIG. 1 shows a side view of a pyrotechnical igniter according to the third aspect of the invention, manufactured with the process according to the first aspect of the invention.

FIG. 1 shows a side view of a pyrotechnical igniter 1 comprising a case 10 welded by a welding cord 11 to a glass crosspiece provided with two connection pins 13 and 13'.

The casing has a side wall 12 with a generally cylindrical shape and a circular base with an axis A and comprises a bottom 19. The side wall 12 of the case 10 comprises three visible vent holes 14, 14', 14" and a fourth one which cannot be seen in the figure and is diametrically opposite the vent hole 14. The four vent holes are uniformly distributed around the axis A. a uniform distribution allows the striking stresses to be balanced when several vent holes are simultaneously struck and allows the igniter 1 to avoid becoming imbalanced during its operation.

The casing 10 can be shaped by a process of cold striking such as stamping from a sheet of soft, nickled steel such as DC04 or DC06. It has a thickness comprised between 0.3 and 0.6 mm and advantageously between 0.35 and 0.5 mm, borders included.

The outside diameter of the case is preferably greater than 7 mm, advantageously greater than 10 mm and is preferably comprised between 12 and 15 mm, borders included.

The vent holes 14, 14', 14" are defined by four weak zones 15 which are local reductions of the thickness of the side wall 12. These weak zones 15 are defined by a profile 16 visible in FIG. 2 and subsequently detailed which extends along a curved line 17. The curved line 17 has the shape of a U whose two ends are folded back towards the inside of the U in such a manner as to form a hinge zone which will allow the vent holes 14, 14', 14" to remain integral with the side wall 12 of the case 10 when they open.

In fact, following the ignition of the igniter 1 by the connection pins 13 and 13' by sending an electrical impulse from the computer of the car in which the igniter 1 is loaded, the combustion of the pyrotechnical material contained inside the case 10 brings about an increase of pressure in the igniter 1. The reduction of thickness of the case 10 at the level of the weak zones 15 causes the vent holes 14, 14', 14" to open at a predetermined pressure defined, among other things, by the thickness of the remaining material and the material of the case, which predetermined pressure is lower than the rupture pressure of the case 10 if it did not have the weak zones 15.

This allows a controlled opening of the vent holes 14, 14', 14", which allows the combustion gases to be freed only at the desired pressure while guaranteeing the integrity of the igniter 1 during its operation. This integrity is important and allows it to be assured that the particles of the igniter 1 do not interfere with the operation of the device in which it is mounted.

Figure 2:
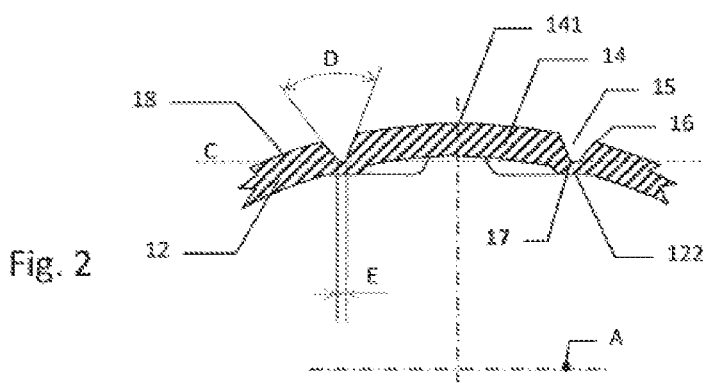
FIG. 2 shows a detailed view of a section of the case of the pyrotechnical igniter of FIG. 1 along the axis B-B.

FIG. 2 shows a detailed view of the vent hole 14 according to a section of the case of the pyrotechnical igniter of FIG. 1 along the axis B-B positioned at the level of the vent holes 14, 14', 14".

The profile 16 of the weak zones 15 is triangular with a truncated point at the bottom of the weak zone 15. The opening angle D of the weak zones 15 is advantageously comprised between 50 and 70 degrees and is preferably 60 degrees. The width of the truncated point E of the profile 16 is comprised between 0.1 and 0.2 mm. The truncated zone is comprised in a plane C.

The thickness of the material remaining at the bottom of the weak zone 15 between the plane C and a plane surface 122 of the casing 10 is comprised between 0.05 and 0.2 mm and preferably between 0.07 and 0.15 mm.

It is important to note that the vent hole 14 has a surface 141 (comprised between the two profiles 16 of the FIG. 2) which is curved in and basically cylindrical. This allows the inner volume of the casing 10 to be maximised.

FIG. 3 shows a section of the casing 10 during the course of a step of the process according to the first aspect of the invention. The case 10 is positioned on a matrix 20 comprising a plane zone 21. The part of the inner surface 121 of the wall 12, comprising at least one curved-in zone, facing this at least one weak zone 15 is positioned along the striking direction F between the plane zone 21 of the matrix 20 and the complementary shape of the weak zone 15 present on a punch 30.

Since the case has a lateral outer surface 18 with a generally cylindrical shape with a circular base with an axis A, there is a maximum distance d between the inner surface 121 of the case 10 and the plane zone 21. The distance d will be adjusted as a function of the dimensions of the weak zone 15 to be realised in order to be as weak as possible in order to reduce the deformations of the case 10 to a minimum during the strike and to maximize in this manner the inner volume of the case 10. By way of example, for a weak zone 15 comprised in a rectangle of 3 mm by 5 mm (5 mm is the dimension following the general direction of the pins 13 and 13') to be struck on a casing 10 of 11.7 mm of inside diameter, the distance d will be 0.4 mm.

Therefore, the process according to the invention proposes directly striking the completely cylindrical case 10 in order to form the weak zone 15, that is, with a profile 16 with a truncated point extending into the plane C, and also with an inner surface 122 which is plane. Therefore, the striking step simultaneously forms the profile 16, the plane C and the inner plane surface 122 while leaving the surface 141 of the vent hole 14 curved in.

FIG. 4 shows a folded-back section at the level of a part of a weak zone 15 after the weak zone was struck on the wall 12 according to the process of the invention and before the ejection of the case 10 from the matrix 20.

The plane zone 21 of the matrix 20 has a clearance angle G with the extraction direction I of the case. In this embodiment the extraction direction I is parallel to the axis A of the case 10 and is oriented in the opposite direction of the pins 13 and 13', which are not shown. The clearance angle could be comprised between 0 and 1□ and advantageously comprised between 0 and 0.5□, including borders.

This clearance angle G brings it about that the distance between the plane C of the outer surface 18 and the inner plane surface 122 can vary according to the shape of the curved line 17 and the curvature of the inner surface 121. Therefore, according to this embodiment of the weak zone 15 shown in FIG. 1, the clearance angle will allow it to be guaranteed that the lowest distance between the plane C of the outer surface 18 and the inner plane surface 122 will be in the lower zone of the U, in the zone closest to the pins 13 and 13'. It is therefore this lower zone of the weak zone 15 which will be the least resistant to a pressure present inside the case 10. Therefore, it is guaranteed that the vent holes 14, 14', 14" will begin to open in these lower zones and the tear will then be propagated along the curved line 17. This improves the reproducibility of the operation of the manufactured igniters. Furthermore, to the extent that the remainder of the weak zone 15 has a thickness between the plane C and the inner plane surface 122 which is thicker, this allows the propagation of the tear during the opening of the vent holes 14, 14', 14" to be slowed down and assures that these vent holes 14, 14', 14" remain connected to the rest of the wall 12 after the operation of the igniter.

It will be understood that various modifications and/or improvements obvious to a person skilled in the art can be added to the different embodiments of the invention described in the present description without departing from the scope of the invention defined by the attached claims.

The invention claimed is:

1. A method of manufacturing a metallic case of a pyrotechnical igniter, the pyrotechnic igniter including a wall having at least one weak zone and an inner surface in the case with at least one part facing the at least one weak zone, the method comprising:
   positioning the case on a matrix having a plane zone; and
   striking the wall with at least one punch so as to, in a single movement of striking:
     deforming at least the at least one part of the inner surface facing the at least one weak zone and having at least one initially curved-in zone in order to bring on the plane zone and to form an inner plane inner surface, and
     to form the at least one weak zone.

2. The method according to claim 1, wherein the case includes a bottom that cooperates with the wall to define a charging volume and the at least one weak zone defines a vent hole, and further wherein deforming at least the part of the inner surface facing the at least one weak zone and having at least one initially curved-in zone leaves at least a part of the vent hole curved in in such a manner as to maximize the charging volume.

3. The method according to claim 1, wherein the wall is a side wall of the metallic case, and the method includes ejecting the case from the matrix according to an ejection axis of the case after the striking step, and formation of the inner, plane surface comprises forming the inner, plane surface with a clearance angle relative to a direction of extraction.

4. The method according to claim 3, wherein the step of striking the side wall with at least one punch simultaneously forms two, three or four weak zones.

5. The method according to claim 1, wherein the wall defines an outer surface of the case, the at least one weak zone is defined by a profile extending along a curved line in a plane, and wherein the striking the wall comprises deforming at least one initially curved-in part of the outer surface in order to bring the at least one initially curved-in part into the plane and to form the at least one weak zone.

6. The method according to claim 5, wherein deformation of the at least one part of the initially curved-in outer surface includes imposing an angle which is not zero between the plane of the outer surface and the plane inner surface.

7. A metallic case of a pyrotechnical igniter comprising a wall defining a charging volume; and
at least one weak zone defined by a profile extending along a curved line positioned on the wall, the at least one weak zone designed to rupture at a predetermined pressure lower than a rupture pressure of the wall;
wherein the at least one weak zone defines a vent hole, the curved line is defined a curved outer surface of the wall opposite a plane inner surface, and at least a part of the inner surface of the vent hole circumferentially between first and second portions of the curved line is curved.

8. The metallic case of a pyrotechnical igniter according to claim 7, wherein the wall is a cylindrical side wall with a circular base along an axis, the side wall having two, three or four weak zones uniformly distributed around the axis.

9. The metallic case of claim 7 in combination with a pyrotechnical igniter, the pyrotechnic igniter further comprising a glass crosspiece, the metallic case welded on the glass crosspiece.

10. The metallic case of claim 7 in combination with a pyrotechnic igniter wherein the pyrotechnic igniter is for a gas generator.

11. The metallic case of claim 7 in combination with a pyrotechnic igniter, wherein the pyrotechnic igniter is for a gas generator of an automobile.

12. The pyrotechnic igniter according to claim 7, wherein the planar bottom is between 0.1 mm and 0.2 mm.

13. The pyrotechnic igniter according to claim 7, wherein the opening angle is between 50 degrees and 70 degrees.

14. The pyrotechnic igniter according to claim 7, wherein the opening angle is approximately 60 degrees.

15. The pyrotechnic igniter according to claim 7, wherein the profile includes a U-shaped portion outlining the vent hole, the vent hole having a curved surface.

16. The metallic case of claim 7, wherein an inner surface of the wall has a planar inner surface portion parallel to the planar bottom of the profile.

17. The metallic case of claim 7, wherein the planar bottom of the profile is radially spaced from a planar inner surface portion of an inner surface of the wall.

* * * * *